July 24, 1928.
F. HOMBERG
1,678,117
METHOD OF MOLDING ALBUMEN CONTAINING MASSES
Filed Jan. 28, 1926
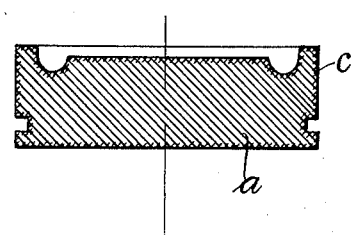
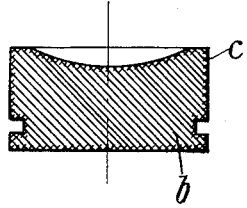
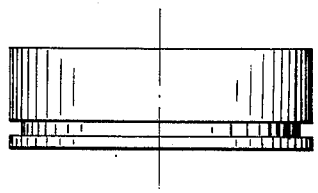
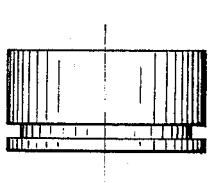
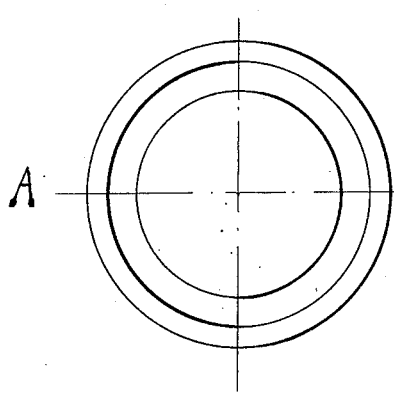
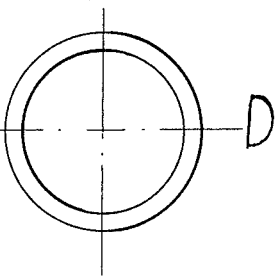

Patented July 24, 1928.

1,678,117

UNITED STATES PATENT OFFICE.

FELIX HOMBERG, OF BARMEN, GERMANY, ASSIGNOR TO AMERICAN NUPLAX CORPORATION, OF NEW YORK, N. Y., A CORPORATION OF DELAWARE.

METHOD OF MOLDING ALBUMEN-CONTAINING MASSES.

Application filed January 28, 1926, Serial No. 84,438, and in Germany April 28, 1925.

As is well known albumen-containing plastic masses with or without filling agents of any type, rubber masses and the like, when pressed under heat and pressure adhere very easily to the metal plungers or molds with the result that very often they can only be beaten out of the molds by means of hammer and chisel. The adhesion of the articles to the molds is due chiefly to the formation of metallic sulphides by the reaction of sulphur compounds in the plastic material with the metal of the mold.

According to the present invention the drawback due to adhesion of the mass to the mold is obviated entirely by coating the metallic molds wholly or partially with metallic chromium, alone or alloyed with other metals. The invention therefore may be regarded as embodied in a process of molding such plastic masses, under heat and pressure, in a mold which is characterized by a coating of chromium or chromium alloys. The coating is best effected galvanically.

In the drawing is illustrated diagrammatically to an enlarged scale an example of a suitable construction for carrying out the invention, namely a pressing mold for pressing buttons from albumen-containing substances.

Fig. 1 is a vertical section of the lower part or matrix on the line A—B of Fig. 3.

Fig. 2 is an elevation of the matrix.

Fig. 3 is a plan corresponding to Figs. 1 and 2.

Fig. 4 is a vertical section of the upper part or matrix on the line C—D of Fig. 6.

Fig. 5 is an elevation of the upper part.

Fig. 6 is a plan of the upper part.

The body of the mold, comprising the mold parts $a$ and $b$ of suitable metal, are, according to this invention, provided with a coating $c$ of chromium, the thickness of which is shown exaggerated in Figs. 1 and 4 for the sake of clearness. This coating need not cover all the surfaces of the mold, as in some circumstances it suffices if it only covers the operative parts of the mold. Preferably and for the sake of convenience however the molds are completely coated with chromium.

Although the particular mold illustrated is adapted for the manufacture of buttons the invention is not of course limited to molds for any particular articles or of any particular shapes.

What I claim is:—

The method of molding albumen containing bodies which comprises providing a metallic mold coated with chromium, and molding said body in said mold.

In testimony whereof I affix my signature.

FELIX HOMBERG.